Sept. 7, 1965   W. R. DICKIE ETAL   3,204,515
EXPLOSIVELY RELEASABLE NUT ASSEMBLY
Filed May 17, 1962
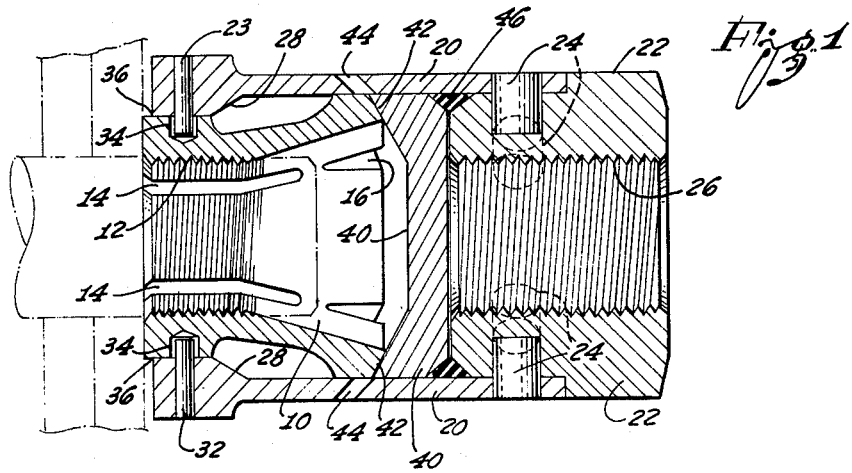
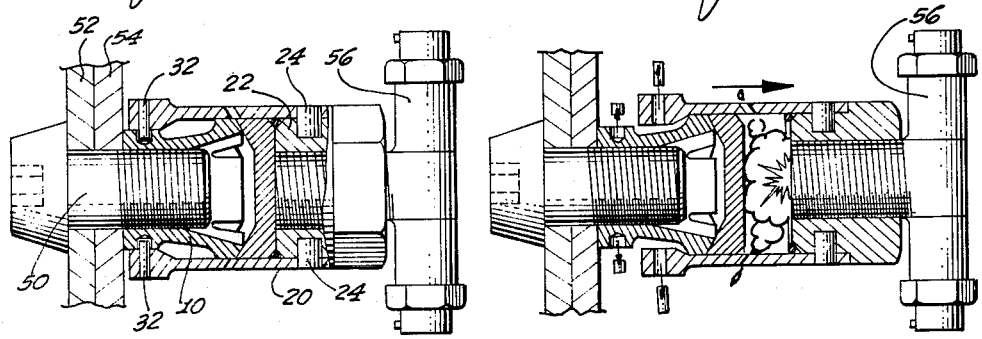
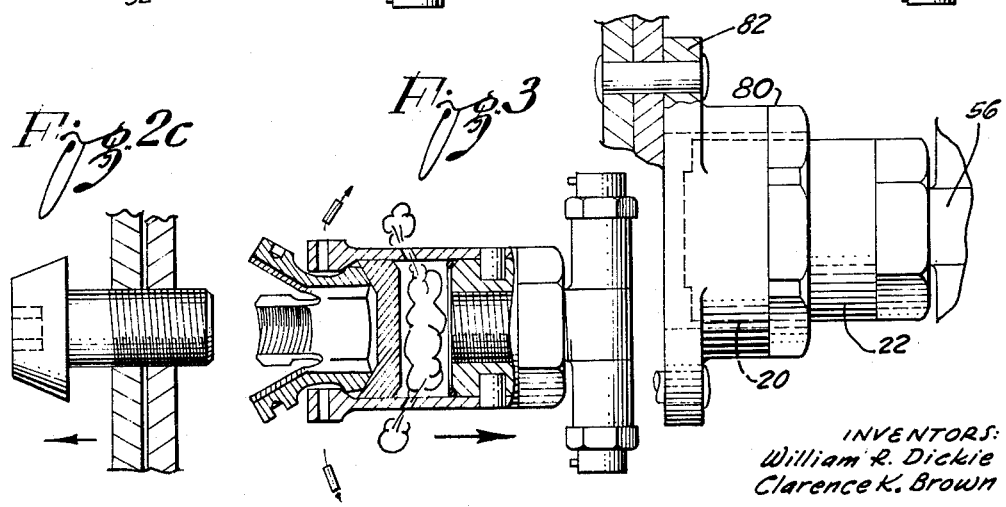
INVENTORS:
William R. Dickie
Clarence K. Brown
By Warren T. Jessup
Attorney though the explosive forces required to rupture the high tensile
United States Patent Office

3,204,515
Patented Sept. 7, 1965

3,204,515
EXPLOSIVELY RELEASABLE NUT ASSEMBLY
William R. Dickie, Manhattan Beach, and Clarence K.
Brown, Long Beach, Calif., assignors to Space Ordnance
Systems, Redondo Beach, Calif., a corporation of
California
Filed May 17, 1962, Ser. No. 195,506
3 Claims. (Cl. 85—33)

The present invention relates to a nut assembly which is adapted to be threaded to the end of a bolt to serve with bolt as a retaining or fastening means for two or more elements, and which is constructed to separate from the bolt and free the bolt in response to an electrically activated explosive charge.

A nut and bolt assembly constructed in accordance with the invention is capable of securely holding the two or more elements together until such time as it is necessary or desired to effectuate an immediate separation of the elements.

The bolt portion of the above-mentioned assembly may be any standard conventional construction. However, the separation nut assembly is constructed to incorporate the principles of the invention. When a separation between the nut and bolt is required, an explosive charge is detonated in a closed chamber associated with the nut. This, in a manner to be described, causes the nut instantaneously to become disengaged from the bolt, thus permitting the elements to separate.

Separation nut assemblies of the general type described above are known to the art. These nut assemblies are usually of the shrouded, captive type, or of the non-shrouded type. The shrouded type of nut assembly is enclosed so that the separated parts after an explosive separation are held captive and are not permitted to fly freely about the surrounding area.

The present invention is concerned with an improved separation nut of the general type described above, and which may be of the shrouded, captive type; or of the non-shrouded type.

Separation nut assemblies of the type under consideration, and with which the present invention is concerned, have a wide field of utilization. For example, the assemblies find use in fighter aircraft to hold the canopy of the cockpit securely in place under normal conditions, and yet to permit the instantaneous release of the canopy under the control of the pilot for escape purposes should the need arise.

In general, the separation nut assemblies with which the present invention is concerned are useful, for example, for the separation or release of elements or components, such as the stages of a multi-stage space vehicle, as well as nose cones, capsules and the like associated with the vehicles. These separation nut assemblies also find utility in releasably securing of aircraft equipment to the air frame, such as ejector seats, fuel tanks, and the other components which are to be jettisoned under certain conditions.

In fact, the separation nut assembly with which the present invention is concerned finds utility whenever two or more elements are to be releasably held together, or whenever components are to be releasably secured in a mounting frame, in situations where it is desired that the elements or components be instaneously released under certain conditions.

The early type of separation nut and bolt assembly has been referred to as the "explosion bolt." In this prior art unit, separation between the nut and bolt is achieved by a force of explosion sufficient to drive the nut axially off the end of the bolt, stripping the threads of the bolt in the process; or by providing a weakened area in the nut or bolt which will fracture when the explosion occurs.

The prior art explosion bolt devices have been found to be inherently dangerous. This is because the high explosive forces required to rupture the high tensile strength nut and bolt have a tendency to propel parts of the assembly with high velocity into the surrounding area.

Because of the inherent dangers in the prior art explosion bolt discussed in the preceding paragraphs, an improved type of assembly has been developed in the prior art. This improved prior art assembly utilizes a mechanical separation system for the nut which requires but a small charge of relatively low pressure explosive powder to obtain effectively and safely the desired separation.

The present invention is concerned with the latter type of assembly, and it is an object of the invention to provide an improved mechanically actuated separation nut which is capable normally of rigidly and securely holding a corresponding bolt in high tensile strength threaded relationship, and yet which is capable of responding to a relatively small explosive charge to effectuate a complete and instantaneous separation of the nut from the bolt.

Another object of the invention is to provide such an improved separation nut assembly which is capable, under normal operating conditions of carrying relatively high torque, tension and shear loads of an associated threadably engaged bolt.

A feature of the invention is the provision of a separation nut assembly which includes a tubular-shaped collet-like nut member adapted to threadably engage a bolt; the nut member being slotted to permit it to be compressed radially inwardly at its inner end about an annular pivotal axis and to open radially at its outer end so as to effect the desired separation from the bolt.

Another feature of the invention is the provision of such a separation nut assembly in which the aforesaid annular pivotal axis is displaced in a longitudinal direction inwardly from the outer end of the nut member, the inward displacement of the pivotal axis serving to reduce to a relatively low level the forces which tend to oppose the radial separation of the outer end of the nut member and which are created by the engagement of the extremity of the nut member with the elements or components fastened thereby.

Yet another feature of the assembly of the invention is the provision of a movable piston member between the explosion cavity of the assembly and the nut member, the piston responding to the force of an explosion in the cavity to move against the nut member and produce the aforementioned radial pivoting action and resulting separation of the nut member.

The inclusion of the aforementioned piston in the assembly of the invention is advantageous in that it produces smooth and uniform action in the assembly of the invention in that the explosive pressure is effectively used and transmitted into a physical force over a large effective working area; and also in that it serves to permit the explosion cavity region to remain unchanged, for uniform and predictable separation results of the nut assembly upon an explosion in the cavity, regardless of how far the associated bolt is screwed into the assembly.

Other features, objects and advantages of the invention will become apparent upon a consideration of the following description in conjunction with the accompanying drawing, in which:

FIGURE 1 is a side sectional view of a separation nut assembly constructed in accordance with the present invention, the assembly being illustrated on an enlarged scale and being of the non-shrouded type;

FIGURES 2A, 2B and 2C are side sectional schematic views, illustrating the manner in which the assembly of FIGURE 1 may be explosively separated from an associated bolt to release the elements held together by the nut and bolt assembly; and FIGURE 3 is a side elevational view of the nut assembly similar to the assembly of FIGURE 1, but supported in a shroud so that the various components of the nut assembly are held captive upon the explosive actuation thereof.

The nut assembly of FIGURE 1 includes a tubular collet-like member 10. This member forms the nut member of the assembly, and it includes a plurality of internal threads 12 at the forward end thereof.

The nut member 10 also includes a first plurality of longitudinal slots 14 which extend inwardly from the forward end thereof to terminate at an annular axis extending around the periphery of the nut member 10 and displaced longitudinally from the forward end of the nut member beyond the center of the member. The forward longitudinal slots 14 are disposed at equi-distant angular positions about the periphery of the nut member.

The nut member 10 also includes a plurality of rear longitudinal slots 16. The rear longitudinal slots 16 extend from the rear end of the nut member 10 and terminate at an annular axis extending around the nut member and displaced from the first-mentioned annular axis. The rear slots 16 are also disposed at equi-distant angular positions around the periphery of the nut member 10, and the rear slots 16 are disposed in respective axial alignment with the forward slots 14.

A relatively thin tubular casing 20 surrounds the nut member 10 in coaxial relationship therewith. The casing 20 fits over a counter-bored forward portion of a relatively thick casing 22. The casing 22 is disposed to the rear of the casing 20 in co-axial relationship with the casing 20 but displaced longitudinally with respect thereto. The casing 20 is secured to the casing 22 by a plurality of pins, such as the pins 24. The casing 22 defines an explosion cavity 26. This cavity is adapted to receive an electrically activated exposive charge for reasons to be described.

The casing 20 has an internally projecting annular portion 28. This annular, inwardly projecting, portion 28 is adapted to engage a cammed outer surface 30 of the nut member 10 upon relative movement of the casing 20 and the nut member.

The unit of FIGURE 1 is held in the illustrated assembled condition by means of a plurality of shear pins, such as the shear pin illustrated at 32. Two such shear pins, for example, may be used. The shear pins 32 extend through the casing 20 into appropriate cavities 34 at the forward end of the nut member 10.

The casing 20 is preferably splined to the collet-like nut member 10 at the surface 36 at the forward end of the nut member. This splined coupling serves to transmit torque exerted on the casing to the nut.

If so desired, the shear pins 32 can be eliminated, and the casing 20 may be secured to the surface 36 at the forward end of the nut member 10 by means, for example, of a suitable adhesive. It will be appreciated that when the nut member 10 is tightened onto an associated bolt, the resulting action of the threads of the bolt will produce a radial movement of the member 10 into a tight and firm contact with the inner surface 36 of the casing 20. This radial forcing of the member 10 outwardly into firm engagement with the surface 36 of the casing 20 has a tendency to assist in holding the assembly in a firm and unitary assembled condition.

A piston 40 is provided in the assembly of FIGURE 1, and this piston is positioned in and extends across the inner cross-section of the casing 20 adjacent the rear end of the nut member 10. The forward end of the piston 40 is shaped to engage the rear surface 42 of the nut member, as illustrated in FIGURE 1.

The rear face of this piston 40 abuts against the end of the tubular casing 22, as illustrated, and the rear face of the piston 40 is exposed to the explosion chamber 26.

It will be appreciated, that the release of an explosive charge in the explosion chamber 26 will cause the casings 20 and 22 to move rearwardly with respect to the piston 40 and nut member 10. This relative movement of the casings 20 and 22 with respect to the nut member 10 first causes the pins 32 to shear. Further relative movement of the nut member 10 and the casings 20 and 22 with respect to the nut member 10 causes the annular projection 28 of the casing 20 to ride along the cammed surface of the nut 10. This action causes a pivotal movement of the nut member 10 about an annular axis extending around the periphery of the nut member 10 between its forward slots 14 and rear slots 16. This pivotal movement causes the forward slots to open and the rear slots to close so as to free the associated bolt which is threadably engaged by the collet-like member 10.

A plurality of escape vents 44 may be provided in the casing 20. These escape vents are normally closed by the piston 40. However, the relative movement of the casing 20 and the piston 40 causes the escape vents subsequently to open and be exposed to the explosion chamber 26.

This opening of the escape vents relieves any further pressure against the piston 40 and causes the explosive force to be dissipated through the vents. This is desirable since the vents are opened only after the useful action of the assembly has been completed, and this decreases the tendency for the parts of the released assembly to be violently propelled around the associated area.

In the embodiment to be described in conjunction with FIGURE 3, the assembly is surrounded by a captive shroud. For the latter embodiment, the vents 44 lead into the annular space between the assembly and the shroud to provide a further cushion in that space for the released and separated parts of the assembly.

The use of the piston 14 in the assembly of FIGURE 1 is advantageous in that it causes the fluid force of the explosion in the explosion chamber 26 to be transformed into a physical force and transmitted with uniform characteristics against the nut member 10. The assembly also provides for a uniform sized cavity 26, regardless of how far the bolt is threaded into the nut member.

The piston 40 also tends to block any leaks in the assembly so as to increase the efficiency with which the explosive force in the cavity 26 is transmitted into a physical useful force. An O-ring 46 may be inserted in a groove formed between the piston 40 and the casing 20, and forward end of the casing 22, as illustrated, further to seal the assembly.

The action of the assembly of FIGURE 1 is schematically shown in the representations of FIGURES 2A, 2B and 2C. As shown in these latter figures, a usual bolt 50 is associated with the assembly of the invention to hold a pair of elements 52 and 54 in assembled condition.

In FIGURE 2A the bolt 50 is threaded into the nut member 10 of the assembly, and an electrically activated explosive cartridge 56 is threaded into the explosion chamber 26 of the casing 22.

Upon the electrical activation of the explosive charge, as shown in FIGURE 2B, the casing 20 is forced back with respect to the nut member 10. Then, the further relative movement between the casing and the nut causes the complete separation, as shown in FIGURE 2C.

The assembly of FIGURE 3 is generally similar to the assembly of FIGURE 1, and like components have been designated by the same numbers. In the latter assembly, however, a shroud 80 having a tubular configuration is positioned to surround the assembly.

The shroud 80, for example, has an end flange 82 which may be secured to the supported elements. The shroud is supported around the assembly of FIGURE 1 in a manner to define an annular space between the shroud and the assembly. Then, the explosive release of the nut member 10 causes the portions of the nut member to move outwardly against the shroud 80 to be held captive. This shroud, therefore, prevents the portions of the nut member from being propelled around the surrounding area.

If so desired, a soft metal washer may be placed in the annular space between the shroud 80 and the assembly to absorb some of the energy as the nut member 10 is separated. Also, and as described above, the escape vents 44 of FIGURE 1 permit the explosive gases to enter into the annular space between the shroud and the nut member to serve as a cushion for the separated portions of the nut member.

The invention provides, therefore, an improved assembly of the separation nut assembly type. The action of the nut member 10 during the separation, by which it is pivotally moved about an annular pivot axis, is advantageous in that it permits the instantaneous release of the nut member from the associated bolt, and without the excessive engagement of the forward extremity of the member with the associated secured element, which engagement tends to retard the separation action.

The composition of the nut member 10 itself, as opposed to the segmented construction of the prior art units, is advantageous in that it provides a strong and secure means for supporting the associated bolt under normal circumstances, without any tendency for the bolt to become separated from the nut assembly until actually released.

The provision of the piston 40 within the assembly, as mentioned above, is advantageous in that it provides for the transformation of the fluid force of the explosion into a smooth and uniform useful physical force in providing the desired separation effect; and also in that it provides for a uniform size of the explosion cavity to permit predictable explosive results to be established.

While particular embodiments of the invention have been shown and described, modifications may be made and it is intended in the claims to cover such modifications as fall within the spirit and scope of the invention.

What is claimed is:
1. An explosively-releasable nut assembly comprising:
a tubular collet-like nut member having a forward end, a rearward end, an axial passageway through said nut member, and internal surface means extending from said forward end for engaging a mating member, said nut member having a plurality of longitudinal slots extending rearwardly from said forward end and terminating at a position displaced from the rearward end thereof, said nut member further having a plurality of longitudinal slots in like number as said forward longitudinal slots extending forwardly from said rearward end and each aligned with a forward slot and extending to a position displaced from the terminus of the forward slots, said forward and rearward slots thereby dividing said nut into a plurality of segments arranged as an annular wall, each segment having a first and second end, said segments joined by a deformable wall section which remains unslotted between the forward and rearward slots, said wall section being radially outwardly spaced from said internal surface means;
a cam surface at the end of each segment on the exterior thereof, said cam surfaces being axially spaced from said wall section and on the opposite side thereof from said segment forward end;

a casing having a first portion defining an explosion cavity and having a second portion surrounding said nut member, said casing including a throat defining an open end, said throat having bevelled surface means for coacting with said cam surfaces as a closing wedge said nut member positioned in said casing and said cam surfaces jointly lying in an array of greater diameter than said surface means and thereby said surface means and cam surfaces being disposed to engage upon relative longitudinal movement of said nut member in said throat opening; and
means disposed in said casing for producing relative movement of said nut member and said casing in the direction of said throat opening to cause said cam surfaces of the nut member to engage into said surface means and close said rear slots and open said forward slots by pivotal action of said nut member segments.

2. An explosively-releasable nut assembly, as defined in claim 1, wherein the wall section has an internal circumference of greater diameter than the diameter of said axial passageway through the forward end, said wall section being around the girth of the nut member as a band and having a total strength against yielding which is lower than the force required to cause the individual segments to yield and thereby will yield and permit the segments to pivot from a first fixed position to a second fixed position, said segments thereafter held by the band around the girth in said section position; and piston means disposed in said casing between said nut member and said cavity and responsive to an explosive force in said cavity for producing relative movement of said nut member and said casing in the direction of said throat opening to cause said cam surfaces of the nut member to engage into said bevelled surface means and close said rear slots and open said forward slots by pivotal action of said nut member segments, thereby to spread the forward portion of the passageway to an enlarged diameter.

3. An explosively-releasable nut assembly, as defined in claim 2, said segments having rearward end surfaces and said piston having face surfaces in contact with said segment end surfaces mutually shaped to produce a radially inward force component upon said segment rearward ends upon application of drive force upon said piston;

whereby, the inward component produces a closing force upon said segment rearward ends to begin deformation pivoting of said wall section as the said relative movement takes place under explosive force.

References Cited by the Examiner

UNITED STATES PATENTS

| 427,930 | 5/90 | Suchland | 85—33 |
|---|---|---|---|
| 1,322,905 | 11/19 | Just | 85—33 |
| 2,259,137 | 10/41 | Iftiger | 285—35 |
| 2,327,714 | 8/43 | Iftiger | 285—35 |
| 2,573,880 | 11/51 | Temple. | |
| 2,750,979 | 6/56 | Jewett | 151—218 |
| 2,855,817 | 10/58 | Kopf. | |
| 3,053,131 | 9/62 | Stott | 85—33 |
| 3,071,404 | 1/63 | Van Hove. | |
| 3,119,298 | 1/64 | Brown | 85—1 |
| 3,120,149 | 2/64 | Dickie | 85—33 |

EDWARD C. ALLEN, *Primary Examiner.*

CARL W. TOMLIN, *Examiner.*